3,249,560
SYNTHESIS OF SUBSTITUTED PHOSPHONAMIDES AND PREPARATION OF POLYMERS THEREFROM

David L. Herring and Catherine M. Douglas, Riverside, Calif., assignors to the United States of America as represented by the Secretary of the Navy
No Drawing. Filed July 17, 1963, Ser. No. 295,853
2 Claims. (Cl. 260—2)

The invention herein described may be manufactured and used by or for the Government of the United States of America for governmental purposes without the payment of any royalties thereon or therefor.

The present invention relates to a general method for the preparation of substituted phosphonamides which are particularly useful as intermediates used in the synthesis of new and useful thermally stable polymeric materials, such as polyphenylphosphonamide; this invention also relates to the synthesis of polyphenylphosphonamide which is a thermo melting plastic that can be cast or moulded.

A member of the class of substituted phosphonamides described in the invention disclosed herein was previously prepared by the following sequence of reactions:

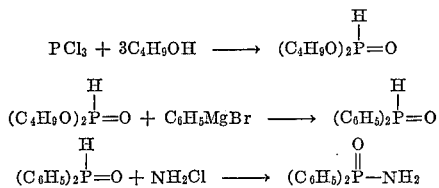

This method is disclosed in the article "Amidation of Some Trivalent Phosphorous Compounds" by K. A. Petrov et al., Zhurnal obshchei Khim 30, 1233–8 (1960). However, the above previous method is tedious, costly, and the yield of product is low. Whereas, the method disclosed in the present invention is inexpensive, less complicated, and the yield products are higher.

A method for preparing polyphenylphosphonamide was described in U.S. Patent No. 2,666,750 and can be described by the following equations:

$C_6H_5P(O)Cl_2$ + excess $NH_3$ $\xrightarrow{\text{low T.}}$

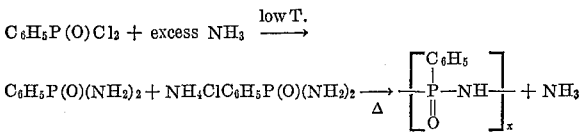

In the above method the phosphonic dichloride must be added to a solution of excess ammonia at a low temperature and then elaborate recrystallization techniques are required to isolate pure $C_6H_5PO(NH_2)_2$. The above method is, therefore, tedious and costly. The present invention however provides an inexpensive method for preparing polyphenylphosphonamide in high yields.

It is an object of the present invention, therefore, to provide a new and improved synthesis for preparation of diphenylphosphonamide.

It is another object of the invention to provide a new and improved synthesis for preparing polyphenylphosphonamide.

Other objects and many of the attendant advantages of this invention will become readily appreciated as the same becomes better understood by reference to the following detailed description.

In the synthesis of the present invention ammoniation of diaryltrichlorophosphoranes leads to the formation of diaryldichlorophosphonamides $R_2P(Cl_2)NH_2$, which in turn can be hydrolyzed by exposure to the atmospheric moisture thus forming diaryl phosphonamide as shown in the following reactions:

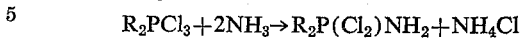
$R_2PCl_3 + 2NH_3 \rightarrow R_2P(Cl_2)NH_2 + NH_4Cl$

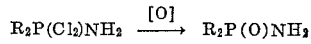
$R_2P(Cl_2)NH_2 \xrightarrow{[O]} R_2P(O)NH_2$

An alternative method for preparing the compounds $R_2P(O)NH_2$ can be accomplished by the reaction of a chloro diaryl phosphonyl chloride, $R_2P(O)Cl$ with ammonia in an inert atmosphere.

A specific example of the foregoing synthesis is described in the following procedures used to prepare

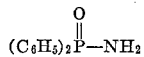
$(C_6H_5)_2P(O)-NH_2$

Diphenyltrichlorophosphorane (22 g., 0.0754 mole) was dissolved in 500 ml. of chloroform in the drybox. The solution was introduced into a three-necked, round-bottomed flask equipped with a mechanical stirrer, a Dry Ice condenser, and a gas inlet tube. The flask was removed from the drybox and cooled to 0°. An ampoule containing 7.7 g. of ammonia (0.453 mole) was attached to the gas inlet tube and opened to the chloroform solution, which was stirred vigorously. The reaction was conducted under a blanket of dry nitrogen for 2 hrs. The chloroform solution was removed by filtration and the solvent evaporated under reduced pressure, yielding an oily material which was extracted in air with boiling benzene. The crystalline residue was washed repeatedly with benzene and dried in an Abderhalden vacuum apparatus. The yield was 7.1 g. (40%) of a material (M.P. 161° C.) that was identified as $(C_6H_5)_2P(O)NH_2$, diphenylphosphonamide calcd. for $(C_6H_5)_2P(O)NH_2$: C, 66.4; H, 5.5; P, 14.3; O, 5.8; N, 6.5; mol. wt. 217. Found C, 66.4; H, 5.5; P, 14.1; O, 5.5; N, 6.7; mol. wt. 223 (obtained osmometrically). The above reaction has been carried out over the temperature range from —20° C. to 40° C.

The sequence of reactions used in the typical procedure above also can be described by the following general equations.

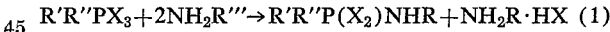
$R'R''PX_3 + 2NH_2R''' \rightarrow R'R''P(X_2)NHR' + NH_2R'' \cdot HX$ (1)

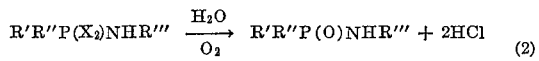
$R'R''P(X_2)NHR''' \xrightarrow[O_2]{H_2O} R'R''P(O)NHR''' + 2HCl$ (2)

where R'=alkyl, aryl or aryloxy; R''=alkyl, aryl or aryloxy; R'''=alkyl or hydrogen; X=halogen, preferably chlorine.

Into a three-necked, round-bottomed flask equipped with a stirrer, a Dry Ice condenser and a gas inlet, 20.0 g. (0.084 mole) of $(C_6H_5)_2P(O)Cl$ dissolved in 500 ml. of chloroform was charged. The flask was removed from the drybox and cooled to 0° C. An ampoule containing 8.2 g. of ammonia was attached to the gas inlet tube and opened to the chloroform solution, which was stirred vigorously. The reaction was conducted under a blanket of nitrogen for 2 hrs. The chloroform solution was removed by filtration and the solvent evaporated under reduced pressure yielding an oily material which was extracted in air with boiling benzene. The crystalline residue after drying weighed 10.5 g. (70%) (M.P. 161° C.).

The sequence of reactions used in the typical procedures above can be described by the following general equation:

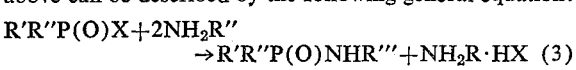
$R'R''P(O)X + 2NH_2R''$
$\rightarrow R'R''P(O)NHR''' + NH_2R'' \cdot HX$ (3)

where

R′=alkyl, aryl or aryloxy
R″=alkyl, aryl or aryloxy
R‴=alkyl or hydrogen
X=halogen The intermediates, (R′R″P(O)NHR‴), substituted phosphonamides are readily converted into polyphosphonamides by heating the substituted phosphonamides, from 275–350° C. under vacuum. Part of the invention disclosed herein is described in the following procedure used to prepare polyphenylphosphonamide

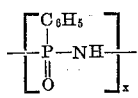

A 5.0 g. sample of $(C_6H_5)_2P(O)NH_2$ was pyrolyzed at 285–290° C. for 16 hrs. in a sealed ampoule. The ampoule was opened to the vacuum line and 49–50% of the available phenyl groups $(C_6H_5)$ were recovered as benzene. The water white residue, polydiphenylphosphonamide had a M.P. of 153–160° C. (softened). The reaction described above is described by the following equation:

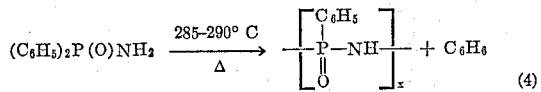

(4)

Calcd. for $C_6H_6PON$: C, 51.7; H, 4.3; P, 22.3; O, 11.5; N, 10.1. Found: C, 50.9; H, 4.8; P, 21.8; O, 13.0; N, 9.6.

When diphenylphosphonamide is pyrolyzed at 320–350° C. for 16 hrs., a mixture of polyphenylphosphonamide polymers was produced which had a softening range above 300° C.

Obviously many modifications and variations of the present invention are possible in the light of the above teachings. It is therefore to be understood that within the scope of the appended claims the invention may be practiced otherwise than as specifically described.

What is claimed is:

1. The synthesis of diphenylphosphonamide which comprises reacting a chloroform solution of diphenyltrichlorophosphorane with ammonia within a temperature range of from −20° C. to 40° C. in an inert atmosphere, and subsequently filtering and removing the chloroform under reduced pressure while simultaneously exposing the reaction mixture to atmospheric oxygen and moisture.

2. The synthesis of polyphenylphosphonamide which comprises pyrolyzing diphenylphosphonamide at 285–290° C. in an evacuated ampoule for a period of time adequate for removal of about 50% of the available phenyl groups as benzene.

References Cited by the Examiner

UNITED STATES PATENTS 2,666,750   1/1954   Dickey et al. _____ 260—2

SAMUEL H. BLECH, *Primary Examiner.*